US010805019B2

(12) United States Patent
Ibaraki et al.

(10) Patent No.: US 10,805,019 B2
(45) Date of Patent: Oct. 13, 2020

(54) WIRELESS NETWORK SYSTEM AND RECEPTION QUALITY MEASUREMENT METHOD

(71) Applicant: Murata Manufacturing Co., Ltd., Kyoto (JP)

(72) Inventors: Suguya Ibaraki, Kyoto (JP); Hisaki Honjo, Kyoto (JP); Tetsu Nishimura, Kyoto (JP); Yuki Maruno, Kyoto (JP); Nobumitsu Amachi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/437,274

(22) Filed: Jun. 11, 2019

(65) Prior Publication Data

US 2019/0296837 A1    Sep. 26, 2019

Related U.S. Application Data

(63) Continuation of application No. PCT/JP2017/044632, filed on Dec. 12, 2017.

(30) Foreign Application Priority Data

Dec. 16, 2016  (JP) .................. 2016-244850

(51) Int. Cl.
*H04W 4/00*    (2018.01)
*H04B 17/318*    (2015.01)
(Continued)

(52) U.S. Cl.
CPC ......... *H04B 17/318* (2015.01); *H04B 17/336* (2015.01); *H04Q 9/00* (2013.01);
(Continued)

(58) Field of Classification Search
None
See application file for complete search history.

(56) References Cited

U.S. PATENT DOCUMENTS

2003/0109270 A1\* 6/2003 Shorty ............... H04L 12/2803
455/517
2005/0141465 A1\* 6/2005 Kato ..................... H04W 48/20
370/337
(Continued)

FOREIGN PATENT DOCUMENTS

JP    2006-339762 A    12/2006
JP    2012-506192 A    3/2012
(Continued)

OTHER PUBLICATIONS

International Search Report for International Application No. PCT/JP2017/044632, dated Jan. 23, 2018.
(Continued)

*Primary Examiner* — Clemence S Han
(74) *Attorney, Agent, or Firm* — Pearne & Gordon LLP

(57) ABSTRACT

A lighting system serving as a wireless network system includes a plurality of lighting appliances, which are a plurality of wireless devices, that each have unique identifier and transmit/receive a radio signal. Under control performed by a lighting controller, an operation is sequentially performed with respect to each of the plurality of lighting appliances in which one lighting appliance from among the plurality of lighting appliances broadcasts a measurement signal that includes the identifier of that lighting appliance and the other lighting appliances receive the measurement signal and measure reception quality, which depends on the distance between the lighting appliances.

10 Claims, 11 Drawing Sheets

(51) Int. Cl.
*H04B 17/336* (2015.01)
*H04W 24/02* (2009.01)
*H04W 40/12* (2009.01)
*H04Q 9/00* (2006.01)
*H05B 47/10* (2020.01)
*H05B 47/19* (2020.01)

(52) U.S. Cl.
CPC ........... *H04W 24/02* (2013.01); *H04W 40/12* (2013.01); *H05B 47/10* (2020.01); *H05B 47/19* (2020.01); *Y02B 20/42* (2013.01)

(56) References Cited

U.S. PATENT DOCUMENTS

| | | | |
|---|---|---|---|
| 2006/0002366 A1* | 1/2006 | Kawaguchi | H04L 45/54 |
| | | | 370/349 |
| 2008/0218334 A1 | 9/2008 | Pitchers et al. | |
| 2010/0273418 A1 | 10/2010 | Eruchimovitch et al. | |
| 2011/0190007 A1 | 8/2011 | Chen et al. | |
| 2015/0366035 A1* | 12/2015 | Baek | H05B 47/19 |
| | | | 315/131 |
| 2018/0115435 A1* | 4/2018 | George | H05B 45/10 |

FOREIGN PATENT DOCUMENTS

| | | |
|---|---|---|
| JP | 4981784 B2 | 7/2012 |
| JP | 2013-232963 A | 11/2013 |
| JP | 2014-161061 A | 9/2014 |

OTHER PUBLICATIONS

Written Opinion for International Application No. PCT/JP2017/044632, dated Jan. 23, 2018.

* cited by examiner

| P | TRANSMISSION SOURCE ID (RECEPTION DEVICE) | TRANSMISSION DESTINATION ID (SERVER) | DATA (TRANSMISSION DEVICE 1, RSSI MEASUREMENT VALUE 1) | ...... | DATA (TRANSMISSION DEVICE M, RSSI MEASUREMENT VALUE M) |

WIRELESS NETWORK SYSTEM AND RECEPTION QUALITY MEASUREMENT METHOD

This is a continuation of International Application No. PCT/JP2017/044632 filed on Dec. 12, 2017 which claims priority from Japanese Patent Application No. 2016-244850 filed on Dec. 16, 2016. The contents of these applications are incorporated herein by reference in their entireties.

BACKGROUND

Technical Field

The present disclosure relates to a wireless network system and a reception quality measurement method, and in particular relates to a technology for automatically identifying the arrangement of a plurality of devices that are connected to each other via a wireless network.

Background Art

There are wireless network systems in which a variety of devices are connected to each other via a wireless network and controlled. One example of such a wireless network system is a lighting system in which the brightness, color, and switching on/off of a large number of lighting appliances is controlled using radio waves.

In order to individually control the lighting appliances in such a lighting system, network identifiers (hereafter, also simply referred to as ID's) such as MAC addresses are assigned in advance to the lighting appliances. The work of installing the lighting appliances is performed in accordance with an arrangement plan or the like that stipulates the relationship between the ID's and the installation positions of the lighting appliances such that the expected operations can be performed immediately after the installing the lighting appliances.

However, in reality, it is often the case that similar lighting appliances are installed without necessarily paying attention to the ID's of the lighting appliances with the result that a lighting appliance that is different from the expected lighting appliance may respond when planned control is performed, and consequently the user is forced to reset the relationship between the ID's and the installation positions of the lighting appliances. Specifically, it is necessary to perform work in which the lighting appliances are controlled one by one, the ID and the position of the lighting appliance that responds are entered into the arrangement plan or the like, and the ID's and positions of the lighting appliances are re-input into the control software.

In order to support or automate such work, a technology that automatically identifies the relationship between the ID of a lighting appliance and the actual installation position of the lighting appliance is useful.

As an example of such a technology, for example, Patent Document 1 discloses a lighting system in which switches and lighting appliances, which are wireless devices capable of wirelessly communicating with each other, are arranged in a plurality of rooms inside a building, and switches and lighting appliances that are located inside the same room are allocated to the same control group.

In Patent Document 1, the arrangement of wireless devices within a wireless network is identified on the basis of received signal strength indicator (RSSI) values that each indicates the distance between two wireless devices and group boundaries are defined between wireless devices that are spaced apart from each other.

Patent Document 1: Japanese Patent No. 4981784

BRIEF SUMMARY

However, in Patent Document 1, it is assumed that the RSSI values between wireless devices are measured in a step in which wireless communication is established between the wireless devices. From the relevant description in Patent Document 1, it is considered that the RSSI values are measured in a state where a one-to-one connection is established for each pair of wireless devices.

The number of pairs of wireless devices increases exponentially as the number of wireless devices within the wireless network increases. Therefore, the processing time required to establish connections, measure RSSI values, and sever the connections for every pair of wireless devices rapidly increases as the number of wireless devices within the wireless network increases. In particular, in a large-scale wireless network, it takes time to establish a connection depending on the radio environment and the distance between wireless devices and there is also a concern that processing operations such as retry and abort operations will occur thus further increasing the processing time.

In other words, there is a problem with the configuration disclosed in Patent Document 1 in that it becomes markedly difficult to measure RSSI values within a practical period of time as the number of wireless devices within the wireless network system increases.

This problem is not limited to lighting systems in which the wireless devices are switches and lighting appliances and will also occur in various types of wireless network systems. For example, similar problems may occur in a sensor network that collects data from a large number of sensors using radio waves, a wide-area wireless network including both sensors and actuators, and a fixed device of a location system that estimates the positions of moving devices. Furthermore, even in the case where another indicator of reception quality that depends on the distance between two wireless devices is measured instead of an RSSI value (for example, signal-noise ratio or bit error rate), a similar problem may arise.

Accordingly, the present disclosure provides a wireless network system and a reception quality measurement method that enable reception quality, which depends on the distance between wireless devices, to be measured in a practical length of time in order to identify the arrangement of wireless devices in a wireless network system.

An aspect of the present disclosure provides a wireless network system that includes a plurality of wireless devices that each has a unique identifier and transmit/receive a radio signal, and in which an operation is sequentially performed with respect to each of the plurality of wireless devices in which one wireless device from among the plurality of wireless devices broadcasts a measurement signal that includes the unique identifier of that wireless device and the other wireless devices receive the measurement signal and measure reception quality, which depends on the distance between the wireless devices.

According to this configuration, compared with the case where reception quality is measured by establishing one-to-one connections for every pair of wireless devices, the number of times a measurement signal is transmitted is reduced from the number of pairs of wireless devices to the number of wireless devices. Therefore, the amount of work performed to measure reception quality is suppressed from an exponential increase to a linear increase as the number of wireless devices within the wireless network system increases. In addition, overheads of establishing and severing connections when performing measurements are also eliminated.

As a result, a wireless network system can be obtained that is capable of measuring reception quality in a practical period of time for every pair of wireless devices even in the case where the number of wireless devices within the wireless network system increases.

In addition, the wireless network system may further include a controller for instructing the plurality of wireless devices to operate, and the controller may instruct each of the plurality of wireless devices to broadcast the measurement signal, to measure reception quality, which depends on the distance between the wireless devices, on the basis of the measurement signals received from the other wireless devices, and to transmit reception quality information including the measured reception qualities to the controller, and the controller may obtain an arrangement of the plurality of wireless devices using distances between the wireless devices based on the reception quality information.

According to this configuration, a low-cost wireless network system can be obtained that is capable of measuring reception quality under the control of a controller while simplifying the functions of wireless devices, and consequently is capable of measuring reception quality for every pair of wireless devices in a practical period of time.

In addition, each of the plurality of wireless devices may transmit, to the controller, the reception quality information representing only top ranking reception qualities, which are fewer in number than the total number of wireless devices, among the measured reception qualities.

According to this configuration, only the top reception qualities that are useful for obtaining the arrangement of the wireless devices are transmitted to the controller, and consequently the amount of communication is reduced, and therefore the controller can collect the reception qualities in a short period of time and can obtain the arrangement of the wireless devices.

In addition, the controller may store, in advance, arrangement information representing a planned arrangement of the plurality of wireless devices and may compare the arrangement of the plurality of wireless devices obtained on the basis of the reception qualities and the planned arrangement represented by the arrangement information.

This configuration is useful in order to discover mistakes in the arrangement of the wireless devices by comparing the planned arrangement and the obtained arrangement of the wireless devices.

In addition, the controller may determine routes from the controller to the plurality of wireless devices in accordance with the arrangement of the plurality of wireless devices obtained on the basis of the reception qualities.

According to this configuration, for example, the shortest routes having a small number of hops can be determined in accordance with the actual arrangement of the wireless devices, and therefore a multi-hop wireless network system that has excellent transmission efficiency can be obtained.

Another aspect of the present disclosure provides a reception quality measurement method in which, in a wireless network system including a plurality of wireless devices that each has a unique identifier and transmit/receive a radio signal, an operation is sequentially performed with respect to each of the plurality of wireless devices in which one wireless device from among the plurality of wireless devices broadcasts a measurement signal that includes the unique identifier of that wireless device and the other wireless devices receive the measurement signal and measure reception quality, which depends on the distance between the wireless devices.

According to this method, compared with the configuration of the related art where reception quality is measured by establishing one-to-one connections for every pair of wireless devices, the number of times a measurement signal is transmitted is reduced from the number of pairs of wireless devices to the number of wireless devices. Therefore, the amount of work performed to measure reception quality is suppressed from an exponential increase to a linear increase as the number of wireless devices within the wireless network system increases. In addition, overheads of establishing and severing connections when performing measurements are also eliminated.

Consequently, a reception quality measurement method can be obtained that is capable of measuring reception quality in a practical period of time for every pair of wireless devices even in the case where the number of wireless devices within the wireless network system increases.

According to the wireless network system and the reception quality measurement method of the present disclosure, a wireless network system and a reception quality measurement method can be obtained that are capable of measuring reception quality in a practical period of time for every pair of wireless devices even in the case where the number of wireless devices within the wireless network system increases.

DETAILED DESCRIPTION

Figure 1:
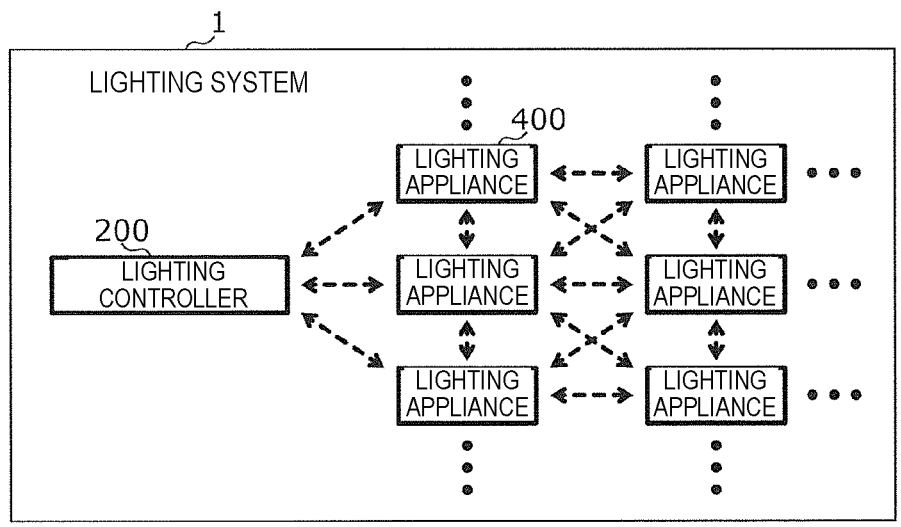
FIG. 1 is a block diagram illustrating an example of the functional configuration of a lighting system according to embodiment 1.

Hereafter, embodiments of the present disclosure will be described in detail using the drawings. The embodiments described hereafter each illustrates a comprehensive or specific example of the present disclosure. The numerical values, shapes, materials, constituent elements, arrangements of the constituent elements, the ways in which the constituent elements are connected, steps, the order of the steps, and so forth described in the following embodiments are merely examples and are not intended to limit the present disclosure. Constituent elements not described in the independent claims among constituent elements in the following embodiments are described as arbitrary constituent elements. In addition, the sizes of the constituent elements illustrated in the drawings or the ratios between the sizes are not necessarily strictly accurate.

Embodiment 1

A wireless network system according to embodiment 1 includes a plurality of wireless devices that each has a unique ID (identifier) and transmit/receive a radio signal, and a controller. In the wireless network, the plurality of wireless devices sequentially execute the following operation under control performed by the controller.

That is, one wireless device among the plurality of wireless devices broadcasts a measurement signal including a unique ID of that wireless device and the other wireless devices receive the measurement signal and measure the reception quality, which depends on the distance between the wireless devices. Examples of the measured reception quality include but are not limited to a received signal strength indicator (RSSI), a signal-to-noise ratio, and a bit error rate.

The controller identifies the arrangement of the plurality of wireless devices included in the wireless network system by using the distances between the devices based on the measured reception qualities.

Hereafter, in order to distinguish between the wireless devices, among the plurality of wireless devices, the one wireless device that broadcasts a measurement signal including the unique ID thereof may be referred to as a transmission device and the other wireless devices may be referred to as reception devices.

In embodiment 1, a lighting system that wirelessly controls the ceiling lighting of an office will be described as an example of a wireless network system.

FIG. 1 is a block diagram illustrating an example of the functional configuration of a lighting system according to embodiment 1. As illustrated in FIG. 1, a lighting system 1 includes a lighting controller 200 and a plurality of lighting appliances 400. Here, the lighting controller 200 is an example of a controller and the lighting appliances 400 are examples of wireless devices.

The lighting controller 200 forms a wireless network together with the plurality of lighting appliances 400. For example, the formed wireless network may be a multi-hop wireless network that performs routing (packet transmission path control). Here, the lighting controller 200 and the plurality of lighting appliances 400 are nodes provided with unique ID's in the wireless network and are configured so as to be able to communicate with each other.

The lighting controller 200 controls the plurality of lighting appliances 400 via the wireless network. The plurality of lighting appliances 400 measure reception quality under control performed by the lighting controller 200. The lighting controller 200 collects the measured reception qualities from the plurality of lighting appliances 400 and identifies the arrangement of the lighting appliances 400 on the basis of the collected reception qualities.

Figure 2:
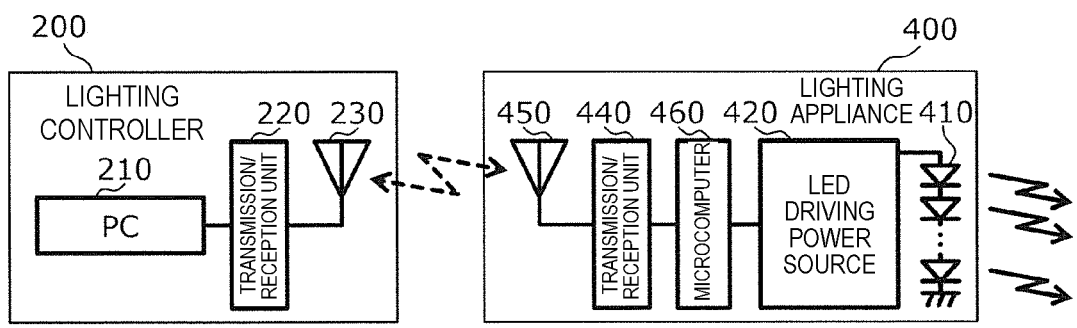
FIG. 2 is a block diagram illustrating an example of the functional configurations of a lighting controller and a lighting appliance according to embodiment 1.

FIG. 2 is a block diagram illustrating an example of the functional configuration of the lighting controller 200 and an example of the functional configuration of each lighting appliance 400. As illustrated in FIG. 2, the lighting controller 200 includes a personal computer (PC) 210, a transmission/reception unit 220, and an antenna 230. The PC 210 may be a personal computer on which prescribed control software is installed and operates. The transmission/reception unit 220 may be a wireless adapter connected to the PC 210 via an interface such as a universal serial bus (USB). The unique ID of the lighting controller 200 in the wireless network may be recorded in the transmission/reception unit 220 in a format such as a MAC address.

Each lighting appliance 400 includes a light-emitting diode (LED) 410, an LED driving power source 420, a transmission/reception unit 440, an antenna 450, and a microcomputer 460 that controls the lighting appliance 400. The microcomputer 460 may include a central processing unit (CPU) and a memory (not illustrated) and may control the lighting appliance 400 via software functions realized by the CPU executing prescribed software stored in the memory in advance. The lighting appliance 400 operates by obtaining power from an electrical light wiring line, which is not illustrated. The unique ID of the lighting appliance 400 in the wireless network may be recorded in the transmission/reception unit 440 in a format such as a MAC address.

Figure 3:
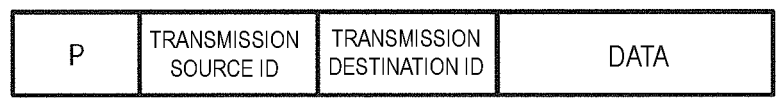
FIG. 3 is a diagram illustrating an example of the format of a unicast packet used in the lighting system according to embodiment 1.

FIG. 3 is a diagram illustrating an example of the format of a wireless packet (hereafter, simply referred to as a packet) used in the lighting system 1. FIG. 3 illustrates an example of a unicast packet used in one-to-one communication between nodes on the wireless network. The packet illustrated in FIG. 3 is used in one-to-one communication between the lighting controller 200 and one lighting appliance 400 and between two lighting appliances 400, for example.

In FIG. 3, for simplicity, only four general fields, namely, P (preamble), transmission source ID, transmission destination ID, and data are illustrated.

The preamble is a bit string that indicates the start of the packet defined by the communication standard.

The transmission source ID is information indicating the ID of the node that is the origin of the packet.

The transmission destination ID is information indicating the ID of the node that is the destination of the packet.

The data may be an operation instruction from the lighting controller 200 to the lighting appliance 400 or may be information representing an operation report from the lighting appliance 400 to the lighting controller 200. Hereafter, in order to distinguish between the packets, a packet that includes an operation instruction to a lighting appliance may be referred to as a command packet and a packet that includes an operation report from a lighting appliance may be referred to as a report packet.

Figure 4:
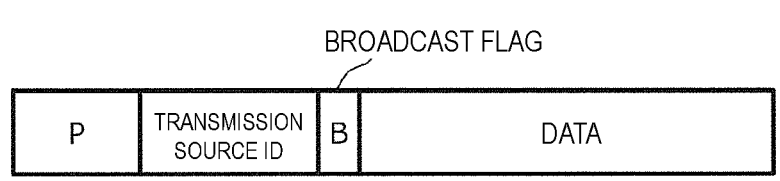
FIG. 4 is a diagram illustrating an example of the format of a broadcast packet used in the lighting system according to embodiment 1.

FIG. 4 is a diagram illustrating another example of the format of a packet used in the lighting system 1. FIG. 4 illustrates an example of a broadcast packet that is sent from one node of the wireless network to every other node of the wireless network. The packet in FIG. 4 differs from the packet in FIG. 3 in that the transmission destination ID has been changed to a broadcast flag B. The packet in FIG. 4 does not include a specific transmission destination ID and is instead transmitted with the destination being all the nodes other than the node that transmits the packet.

Figure 5:
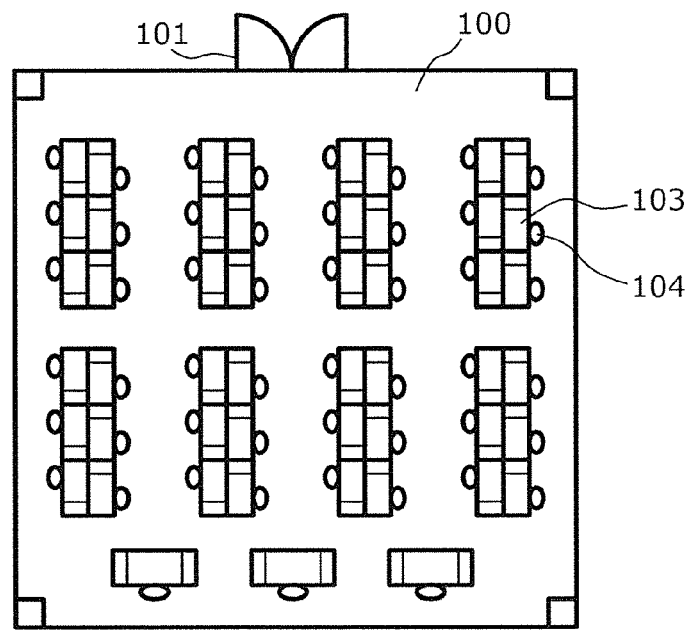
FIG. 5 is a plan view illustrating an example of the floor layout of an office.

FIG. 5 is a plan view illustrating an example of the floor layout of an office 100 in which the lighting system 1 is installed. In FIG. 5, the arrangements of a door 101, desks 103, and chairs 104 in the office 100 are illustrated.

Figure 6:
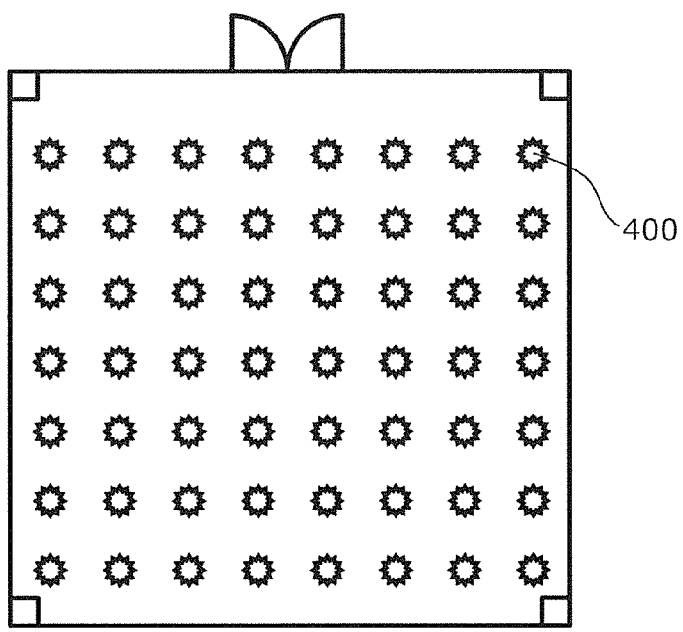
FIG. 6 is a plan view illustrating an example of the arrangement of lighting appliances in the office.

FIG. 6 is a plan view illustrating an example of the arrangement of the lighting appliances 400 in the office 100. As illustrated in FIG. 6, the plurality of lighting appliances 400 are arranged in a grid pattern in the office 100. For example, the lighting appliances 400 may be ceiling lighting appliances that are installed in the ceiling of the office 100. Each lighting appliance 400 is a wireless device constituting the lighting system 1 and is identified using the unique ID thereof.

Figures 7A, 7B:
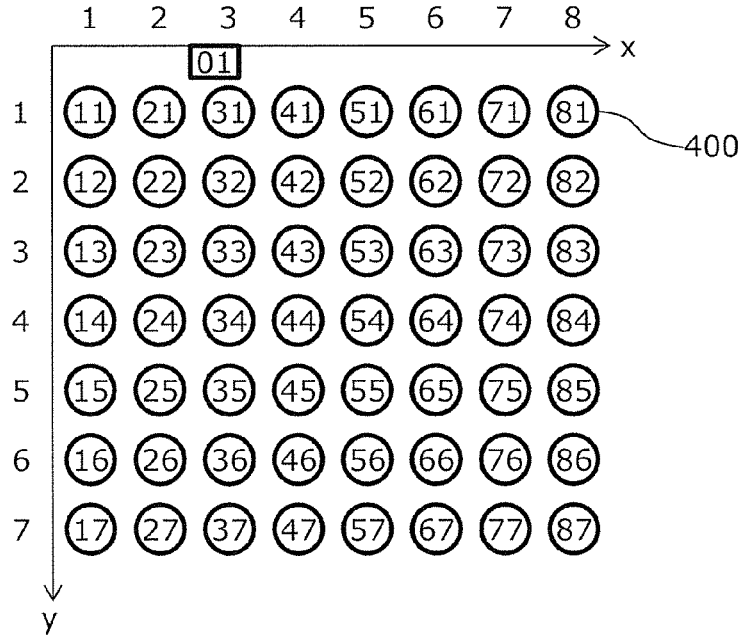
FIG. 7A is a diagram illustrating an example of a planned arrangement of the lighting appliances.
FIG. 7B is a diagram illustrating an example of an arrangement information table that stores a planned arrangement of the lighting appliances.

FIG. 7A is a diagram illustrating an example of the planned arrangement (i.e., planned installation positions) of the lighting controller 200 and the lighting appliances 400. In FIG. 7A, the planned arrangement of the lighting controller 200 (rectangle) and the planned arrangement of lighting appliances 400 (circles) are illustrated using xy coordinates where the x axis extends from left to right and the y axis extend from top to bottom. In addition, the ID's of the lighting controller 200 and the lighting appliances 400 are illustrated in a simplified manner using two digit numbers inside the respective rectangle and circles.

The example in FIG. 7A illustrates a plan in which the lighting appliances 400 are arranging at positions having xy coordinates that are identical to the simplified ID's. This type of planned arrangement is for example visually depicted by an arrangement plan and a worker installs the lighting appliances 400 in accordance with the arrangement plan.

The lighting system 1 may store arrangement information representing the planned arrangement in a table format, for example.

FIG. 7B is a diagram illustrating an example of an arrangement information table that stores the planned arrangement of the lighting controller 200 and the lighting appliances 400. An arrangement information table 250 in FIG. 7B may be provided in the PC 210, for example. The arrangement information table 250 includes entries that have a one-to-one correspondence with the devices (such as the lighting controller 200 and the lighting appliances 400). The ID's of the corresponding devices and the planned arrangements are stored in an ID column 251 and a planned arrangement column 252 of the respective entries. The contents of the arrangement information table 250 in FIG. 7B corresponds to the planned arrangement in FIG. 7A.

Figure 8:
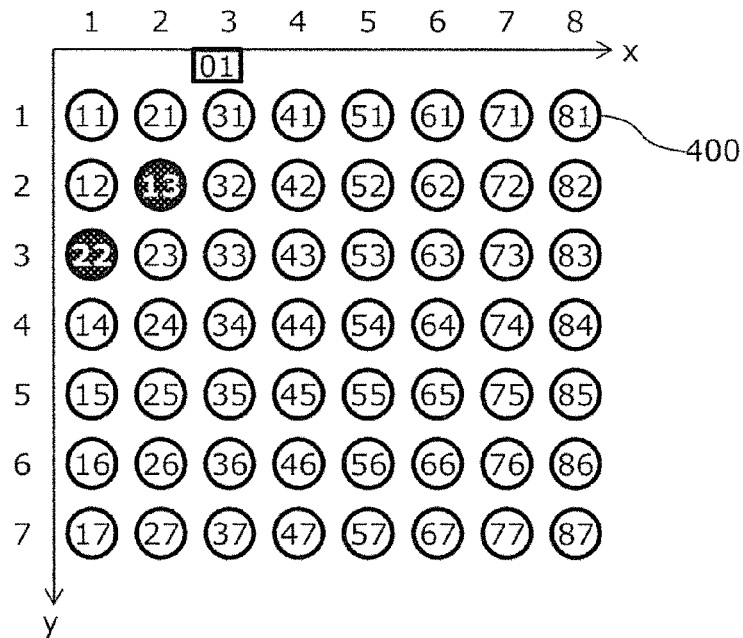
FIG. 8 is a diagram illustrating an example of the actual arrangement of the lighting appliances.

FIG. 8 is a diagram illustrating an example of the actual arrangement of the lighting controller 200 and the lighting appliances 400.

Figure 9:
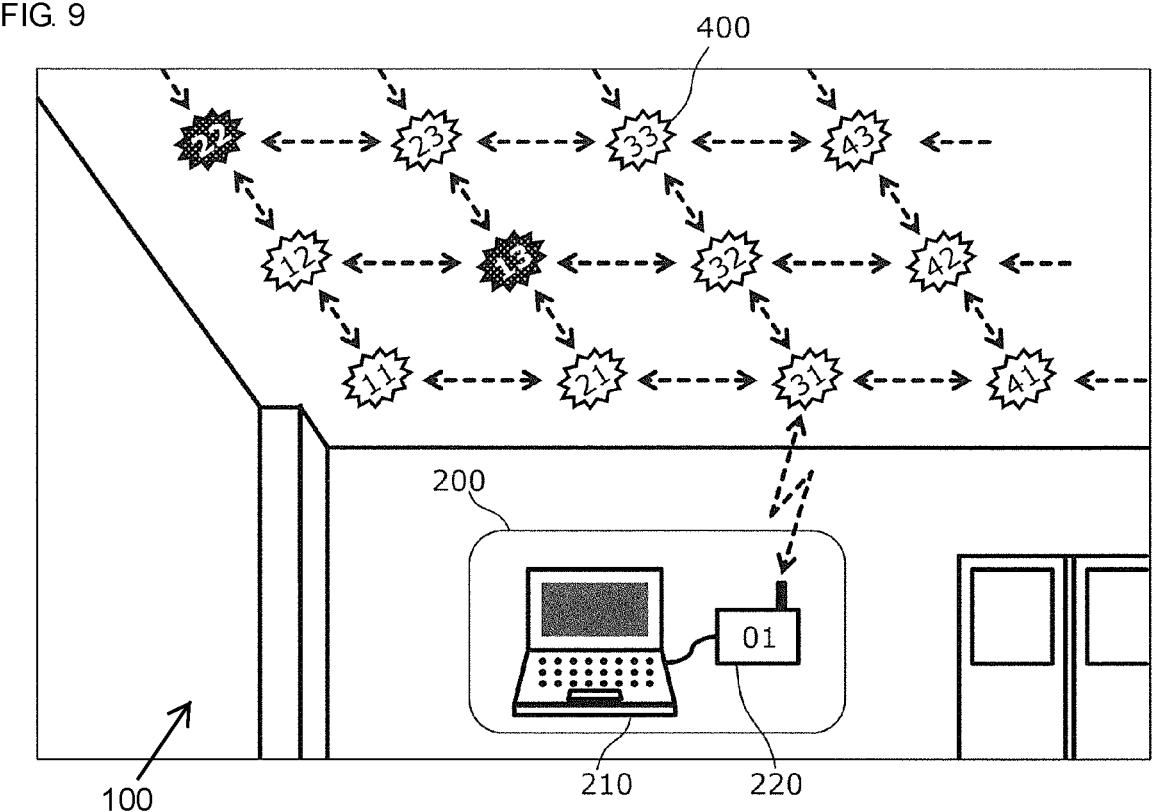
FIG. 9 is a perspective view illustrating an example of the installation state of the lighting system.

FIG. 9 is a perspective view illustrating an example of the installation state of the lighting controller 200 and the lighting appliances 400. FIG. 9 illustrates a state in which the vicinity of the upper left corner in FIG. 8 is viewed from the floor.

In the example in FIGS. 8 and 9, the lighting appliance having an ID of 13 and the lighting appliance having an ID of 22 (highlighted using white characters on a gray background) are installed so as to have been swapped with each other. As described above, a technology is demanded for automatically identifying the actual arrangement of the lighting appliances 400 in order to efficiently detect such a situation.

Next, device arrangement identification processing executed by the thus-configured lighting system 1 will be described. The device arrangement identification processing includes reception quality measurement processing performed by broadcasting a measurement signal.

Figure 10A:
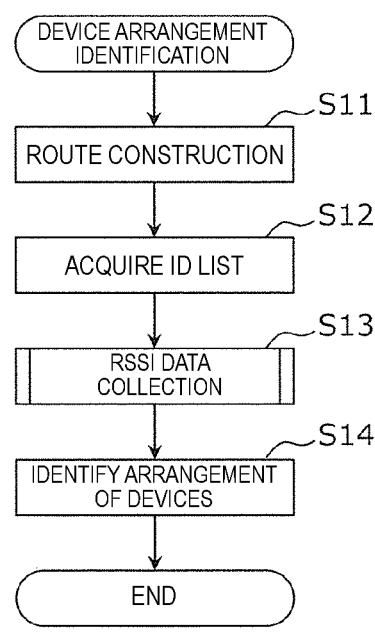
FIG. 10A is a flowchart illustrating an example of device arrangement identification processing according to embodiment 1.

FIG. 10A is a flowchart illustrating a rough example of the device arrangement identification processing.

In the device arrangement identification processing, first, the lighting controller 200 transmits a route construction packet (S11). For example, it may be assumed that the lighting appliances 400 are connected to each other in the random order in which the route construction packet is received by the lighting appliances 400, and as a result, a mesh network having routes from the lighting controller 200 to arbitrary lighting appliances 400 within the network is obtained.

The lighting controller 200 acquires an ID list of the lighting appliances 400 within the network (S12). The lighting controller 200 acquires the number of devices N of the lighting appliances 400 together with the ID list of the lighting appliances 400 within the network.

Specifically, the lighting controller 200 may check that the planned lighting appliances 400 are present within the wireless network without necessarily there being any extra or missing lighting appliances 400 by receiving the respective ID's from the lighting appliances 400 and checking the ID's against the ID's in the arrangement information illustrated in FIG. 7B. Arrangement information including just the planned lighting appliances 400 without necessarily there being any extra or missing lighting appliances 400 is an example of the ID list.

It would not be clear whether there are any lighting appliances 400 installed at incorrect positions from just acquiring the ID list. Accordingly, the lighting controller 200 executes RSSI data collection processing (S13) on the basis of the ID list and the number of devices N and identifies the arrangement of the lighting appliances 400 on the basis of the collected RSSI data (S14). Here, the RSSI data collection processing is an example of reception quality measurement processing.

Figure 10B:
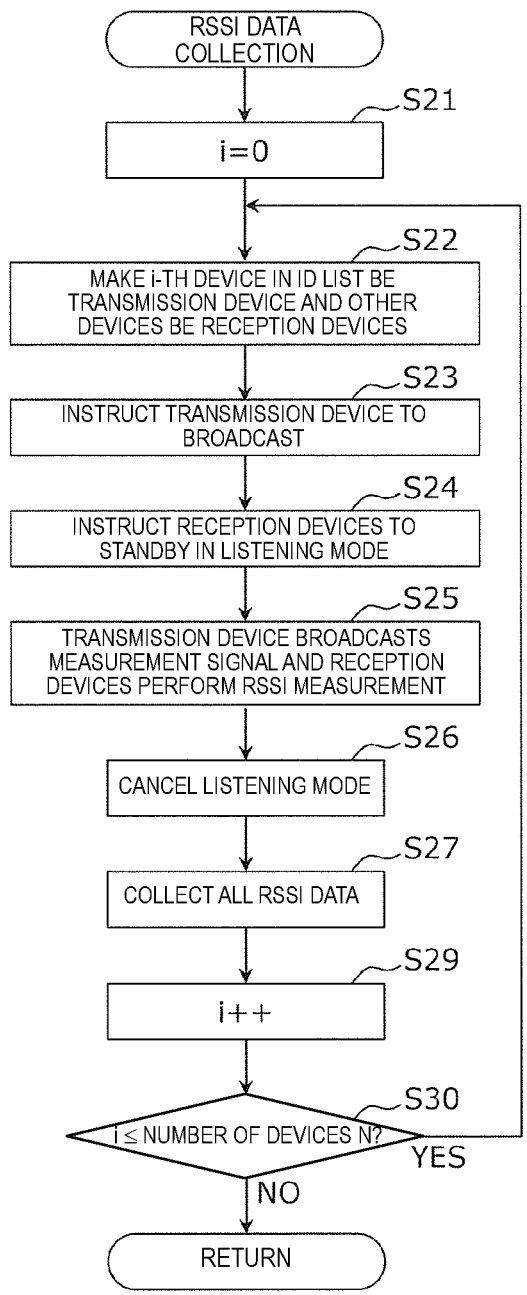
FIG. 10B is a flowchart illustrating an example of RSSI data collection processing according to embodiment 1.

FIG. 10B is a flowchart illustrating an example of the RSSI data collection processing.

In the RSSI data collection processing, the lighting controller 200 first sets an operation variable i to 0 (S21). The operation variable i is an index that specifies an arrangement information entry (that is, one device among the lighting controller 200 and the plurality of lighting appliances 400).

For example, the lighting controller 200 refers to the arrangement information table 250 in FIG. 7B, makes the device corresponding to the i-th entry in the arrangement information be a transmission device, and makes the other devices be reception devices (S22). The lighting controller 200 instructs the transmission device to broadcast an RSSI measurement signal (S23) and instructs the reception devices to wait to receive the RSSI measurement signal in a listening mode (S24). For example, the transmission device and the reception devices may be instructed using a unicast packet in which the ID stored in the ID column 251 in the corresponding entry in the arrangement information table 250 is the transmission destination ID.

The transmission device broadcasts the RSSI measurement packet, which is an RSSI measurement signal, in accordance with an instruction from the lighting controller 200.

Next, the RSSI measurement packet will be described.

Figure 11:
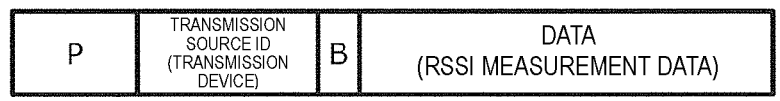
FIG. 11 is a diagram illustrating an example of the format of an RSSI measurement packet according to embodiment 1.

FIG. 11 is a diagram illustrating an example of the format of the RSSI measurement packet. As illustrated in FIG. 11, the RSSI measurement packet may be expressed using the format of the broadcast packet in FIG. 4. The transmission source ID of the RSSI measurement packet is the ID of the transmission device, the RSSI measurement packet has a broadcast flag B, and the data of the RSSI measurement packet includes appropriate RSSI measurement data.

Referring to FIG. 10B again, the reception devices wait to receive an RSSI measurement signal for a prescribed period of time in accordance with the instruction from the lighting controller 200 and each records the RSSI value of an RSSI measurement signal received within the prescribed period of time. In the case where an RSSI measurement signal could not be received within the prescribed period of time, the reception devices record a specific error value indicating that an RSSI measurement signal could not be received. At the time point where the prescribed period of time elapses, the reception devices cancels the listening mode (S26) and transmit the recorded RSSI values (including error values) to the lighting controller 200.

Next, an RSSI report packet will be described.

Figure 12:
FIG. 12 is a diagram illustrating an example of the format of an RSSI report packet according to embodiment 1.

FIG. 12 is a diagram illustrating an example of the format of an RSSI report packet. As illustrated in FIG. 12, the RSSI report packet may be expressed using the format of the unicast packet in FIG. 3. The transmission source ID of the RSSI report packet is the ID of the reception device, the transmission destination ID is the ID of the lighting controller 200, and the data of the RSSI report packet includes the ID of the transmission device and an RSSI measurement value (including error value).

Figure 13:
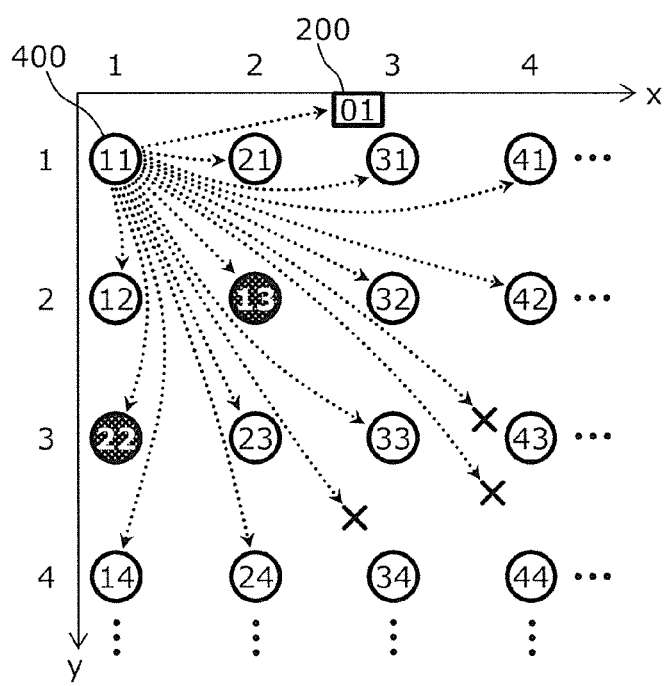
FIG. 13 is a diagram illustrating an example of the arrival states of RSSI measurement packets according to embodiment 1.

FIG. 13 is a diagram schematically illustrating the arrival states of the RSSI measurement packets. The example in FIG. 13 corresponds to a case in which the operation variable i is 1, the lighting appliance 400 having an ID of 11 is the transmission device, and the lighting appliance 400 having an ID of 11 broadcasts the RSSI measurement packet. The RSSI measurement packet arrives at the lighting appliances in the vicinity of the transmission device (Euclidean distance of 4 or less in FIG. 13) but does not arrive at the lighting appliances that are further away. After the prescribed period of time has elapsed, RSSI values from the lighting appliances that were able to receive the RSSI measurement packet and error values from the lighting appliances that were not able to receive the RSSI measurement packet are reported back to the lighting controller 200.

Thus, according to the lighting system 1, an RSSI measurement value or an error value indicating non-arrival of an RSSI measurement packet can be acquired from (N−1) reception devices by using an RSSI measurement packet broadcast by one transmission device.

Referring again to FIG. 10B, the lighting controller 200 collects RSSI data by receiving the RSSI report packets transmitted from all of the reception devices (S27).

The lighting controller 200 incrementally increases the operation variable i (S29) and executes the above-described processing while sequentially making the device corresponding to the respective entry in the arrangement information serve as the transmission device (YES in S30).

Via the above-described processing, the lighting controller 200 can acquire RSSI values (including error values) for all pairs of devices (including the lighting controller 200 and each lighting appliance 400) by broadcasting the same number of RSSI measurement packets as the number of devices.

In the case where RSSI values are measured in a state where a one-to-one connection is established for each pair of devices, the amount of work required to measure the RSSI values (specifically, the number of times an RSSI measurement packet is transmitted) exponentially increases as the number of devices increases. In contrast, in the above-described configuration, the amount of work required to measure the RSSI values is suppressed to a linear increase as the number of devices increases. Furthermore, for example, when measurement is performed, overheads related to establishing and severing connections such as retry processing that occurs when attempting to establish a connection to a distant lighting appliance and abort processing caused by a timeout are also eliminated.

The lighting controller 200 can identify the relative positions of the lighting appliances 400 by using the acquired RSSI values and a known method. Here, in a case where there are three or more lighting appliances 400 located at positions that can be trusted, an arrangement without necessarily rotation or inversion can be identified by using the positions that can be trusted as constraint conditions. In order to obtain positions that can be trusted, for example, any three lighting appliances 400 may be controlled by specifying their ID's and the actual installation positions of the lighting appliances 400 may be visually confirmed.

Figure 14:
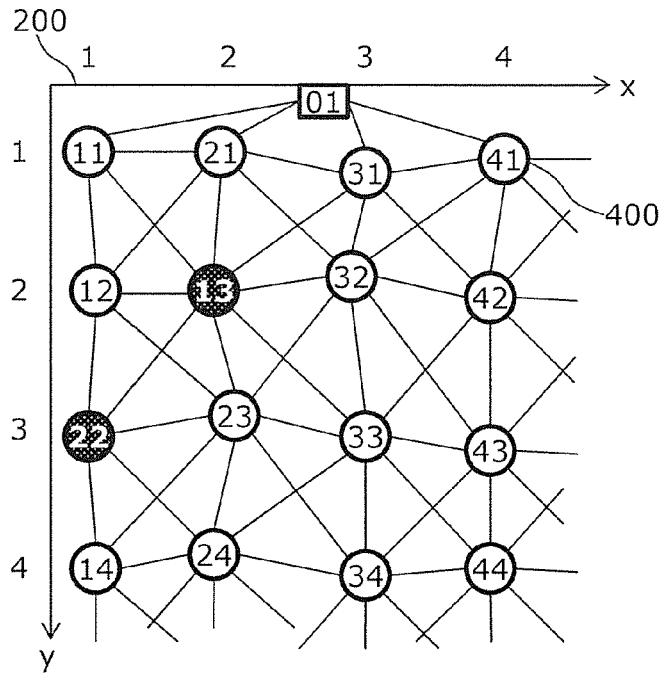
FIG. 14 is a diagram illustrating an example of the identified arrangement of the lighting appliances.

FIG. 14 is a diagram illustrating an example of an arrangement of the lighting controller 200 and the lighting appliances 400 identified from the measured RSSI values. In FIG. 14, the arrangement of the lighting controller 200 and the lighting appliances 400 is illustrated using the same notation as employed in FIG. 7A. In FIG. 14, additionally, connections between nodes (routes) are illustrated. A more efficient network can be obtained by re-routing the mesh network that was previously constructed on the basis of the identified arrangement of the lighting appliances 400.

The lighting system 1 may store arrangement information representing the identified arrangement in a table format, for example.

Figure 15:
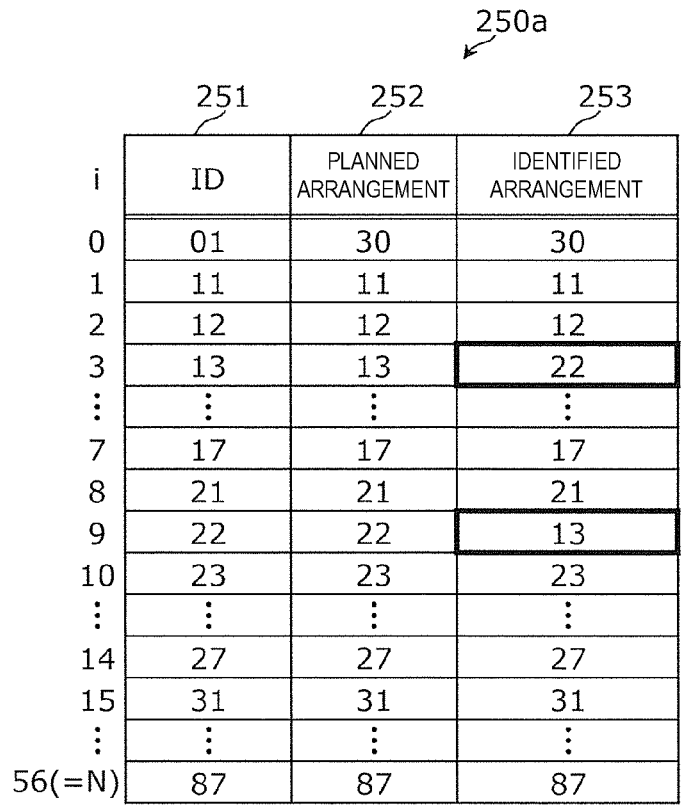
FIG. 15 is a diagram illustrating an example of an arrangement information table that stores the identified arrangement of the lighting appliances.

FIG. 15 is a diagram illustrating an example of an arrangement information table that stores the identified arrangement of the lighting controller 200 and the lighting appliances 400. An arrangement information table 250a in FIG. 15 may be provided in the PC 210, for example. The arrangement information table 250a is obtained by adding an identified arrangement column 253 to the arrangement information table 250 in FIG. 7B. The content of the arrangement information table 250a in FIG. 15 corresponds to the identified arrangement in FIG. 14.

The lighting controller 200 detects devices that are installed at different positions from the positions in the plan by comparing the planned arrangement column 252 and the identified arrangement column 253 of the arrangement information table 250a. In the example in FIG. 15, it is detected that the lighting appliance having an ID of 13 and the lighting appliance having an ID of 22 are installed at different positions from the positions in the plan (highlighted using thick frames).

When a mistake is discovered in the installation positions of the devices, for example, the mistake may be corrected by swapping the ID's of the devices via software setting in the case of compatible devices or replacement work (adjustment work) may be performed in the case of non-compatible devices such as in the case where the color of one of the devices cannot be adjusted.

As described above, compared with the case where the RSSI values are measured in a state where one-to-one connections are established between the devices, the number of times a measurement signal is transmitted is reduced from the number of pairs of wireless devices to the number of wireless devices in the lighting system 1 according to this embodiment. Therefore, the amount of work required to measure the RSSI values as the number of wireless devices within the wireless network system increases is reduced to a linear increase from an exponential increase. In addition, overheads of establishing and severing connections when performing measurements are also eliminated.

As a result, a wireless network system can be obtained that is capable of identifying the actual arrangement of devices within a wireless network by measuring the RSSI values in a practical period of time for every pair of wireless devices even in the case where the number of wireless devices within the wireless network system increases.

In addition, this effect is not restricted to RSSI values and is also obtained in a case where another reception quality indicator such as a signal-to-noise ratio or a bit error rate that depends on the distance between devices is measured in order to identify the actual arrangement of devices.

Embodiment 2

Similarly to embodiment 1, a wireless network system according to embodiment 2 is a wireless network system that suppresses an increase in the amount of measurement work performed with respect to an increase in the number of devices by measuring a reception quality indicator (for example, an RSSI value) that depends on the distance between devices by broadcasting a measurement signal.

In the wireless network system according to embodiment 2, additionally, the amount of communication required to transmit RSSI report packets is reduced and the amount of memory required in the lighting appliances is reduced.

Figure 16:
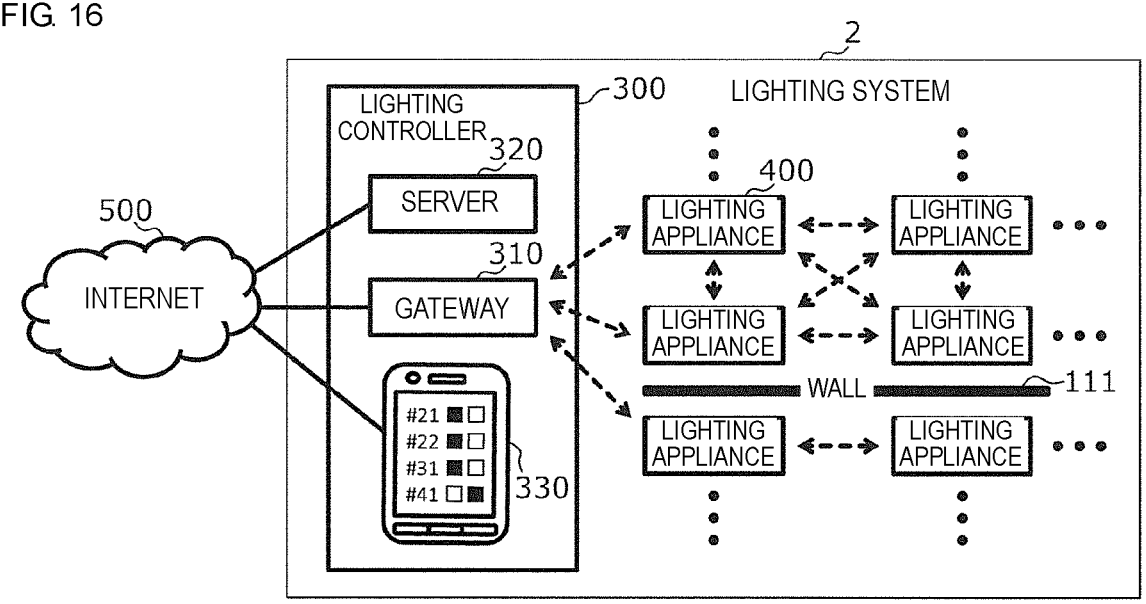
FIG. 16 is a block diagram illustrating an example of the functional configuration of a lighting system according to embodiment 2.

FIG. 16 is a block diagram illustrating an example of the functional configuration of a lighting system according to embodiment 2. As illustrated in FIG. 16, a lighting system 2 differs from the lighting system 1 in FIG. 1 in that a lighting controller 300 is changed and the lighting appliances 400 are divided so as to be arranged in two rooms separated by a wall 111.

The lighting controller 300 includes a gateway 310, a server 320, and a mobile terminal 330, which are connected to each other via an Internet 500.

The gateway 310 connects each lighting appliance 400 to the Internet 500.

The server 320 may be a computer on which prescribed control software is installed and operates, and the server 320 realizes functions corresponding to those of the PC 210 in the lighting system 1.

The mobile terminal 330 includes a touch panel and a display and provides a user interface for the control software operating in the server 320.

Figure 17:
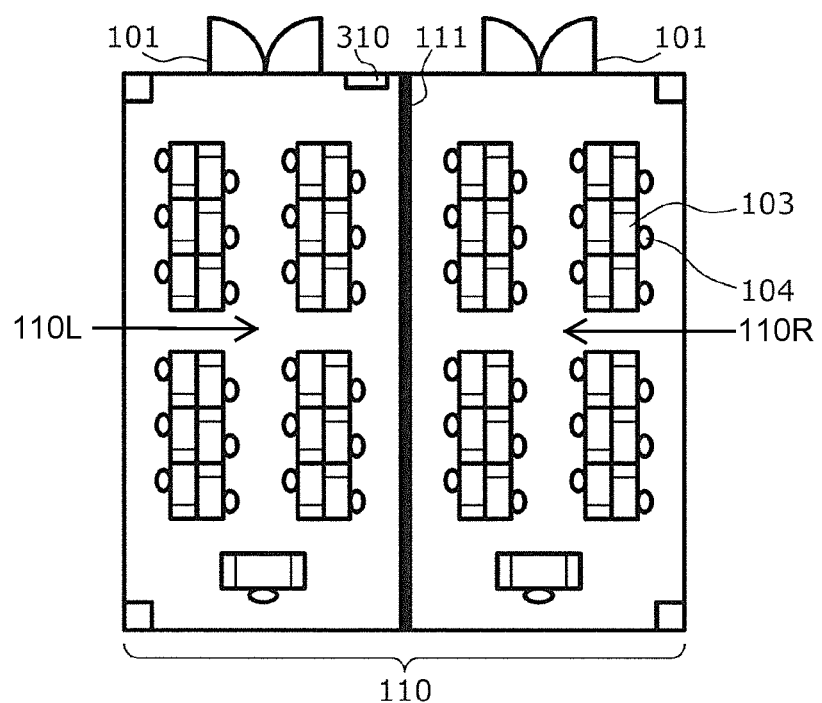
FIG. 17 is a plan view illustrating an example of the floor layout of an office.

FIG. 17 is a plan view illustrating an example of the floor layout of an office 110 in which the lighting system 2 is installed. The office 110 differs from the office 100 in FIG. 5 in that the office 110 is divided into two rooms 110L and 110R by the wall 111. The gateway 310 is shared by the left room 110L and the right room 110R.

Next, RSSI data collection processing executed by the thus-configured lighting system 2 will be described.

Figures 18, 19:
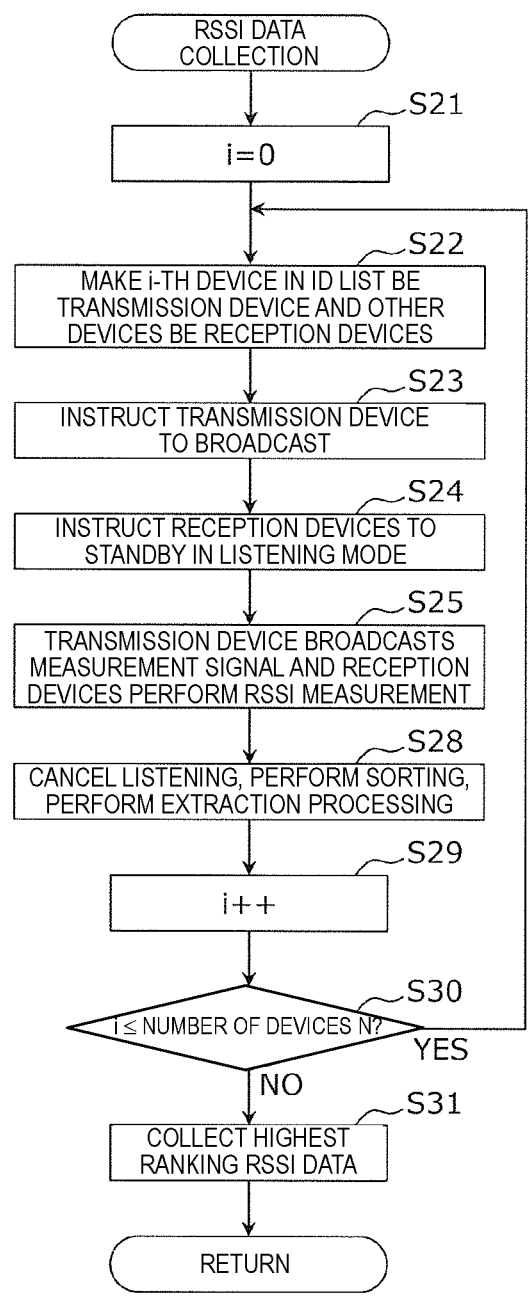
FIG. 18 is a flowchart illustrating an example of RSSI data collection processing according to embodiment 2.
FIG. 19 is a diagram illustrating an example of the format of an RSSI report packet according to embodiment 2.

FIG. 18 is a flowchart illustrating an example of the RSSI data collection processing. The RSSI data collection processing illustrated in FIG. 18 is identical to the RSSI data collection processing in FIG. 10B in that RSSI values are measured using a broadcast RSSI measurement packet and differs in that each lighting appliance reports only the highest RSSI values, the number of which is less than the total number of lighting appliances, among the measured RSSI values to the server 320.

In the lighting system 2, similarly to the lighting controller 200, the lighting controller 300 instructs a transmission device to broadcast an RSSI measurement signal (S23) and instructs reception devices, which are the other devices, to wait to receive the RSSI measurement signal in a listening mode (S24) while sequentially making each device of the 0-th to N-th entries in the arrangement information be the transmission device (S21, S22, S29, S30).

Each reception device measures the RSSI value of the RSSI measurement signal (S25), compares previously measured RSSI values and the most recent measured value, stores the M highest RSSI values, and discards the (M+1)-th and subsequent pieces of data (S28).

Then, once the waiting to receive the RSSI measurement signal broadcast from the device of the N-th entry is complete, each device transmits the stored M ID's and pieces of data to the lighting controller 300 via the previously constructed mesh network.

Next, an RSSI report packet will be described.

FIG. 19 is a diagram illustrating an example of the format of an RSSI report packet. The RSSI report packet in FIG. 19 differs from the RSSI report packet in FIG. 12 in that the RSSI report packet in FIG. 19 includes up to M pairs of a transmission device ID and an RSSI measurement value and in that once measurement of the RSSI values of the RSSI measurement packets from all the devices is complete, the data is transmitted in one batch.

Referring again to FIG. 18, the lighting controller 300 receives the RSSI report packets transmitted from all of the reception devices and collects the top RSSI values (S31). Similarly to as in embodiment 1, the lighting controller 300 identifies the actual arrangement of the devices by using the collected RSSI values and compares the planned arrangement and the identified arrangement.

Here, in the case where the lighting appliances are arranged in a square, M is set to be around 4 to 8, and in the case of a more complex arrangement of lighting appliances, M is increased in accordance with the arrangement state. M is set to be around 4 to 8 based on the following considerations.

Figure 20:
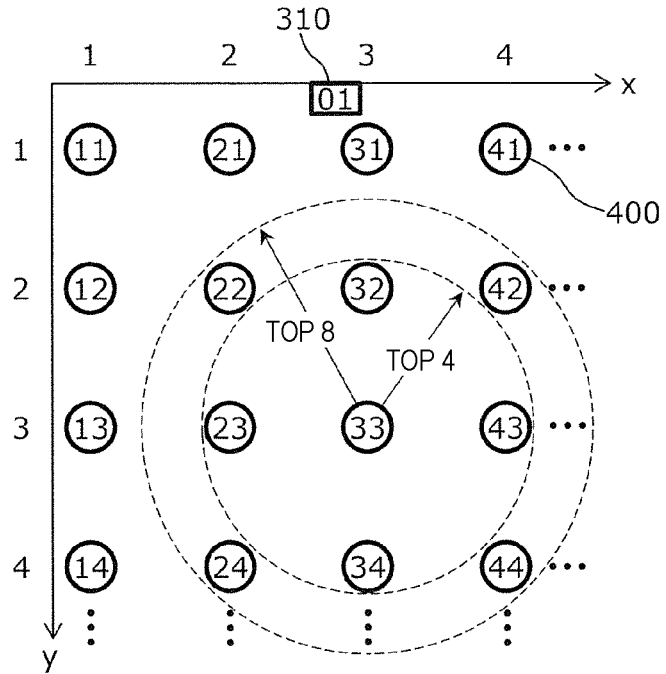
FIG. 20 is a plan view illustrating an example of the arrangement of lighting appliances according to embodiment 2.

FIG. 20 is a diagram illustrating an example of lighting appliances 400 arranged in a square shape. In the case of a square arrangement, when the RSSI values of four devices in the vertical and horizontal directions (inside the inner broken line circle) are known, an arrangement topology, which is obtained by repeating this arrangement, can be reproduced. When the RSSI values of eight devices including devices disposed on diagonals (inside the outer broken line circle) are known, an arrangement topology can be reproduced even in the case where there are some positional deviations from the square arrangement or the propagation state has a directivity that depends on the state of the building. Furthermore, usually, the top four to eight devices having the highest RSSI values are the most important devices for measuring the wireless proximity of devices and for forming a multi-hop network.

As described above, according to the lighting system 2, the lighting appliances 400 transmit up to M higher RSSI values, which are useful for acquiring the arrangement of the devices, to the lighting controller 300, and consequently the amount of communication is reduced. Thus, the lighting controller 300 can collect the reception qualities in a short period of time and can obtain the arrangement of the lighting appliances 400. Furthermore, the amount of memory required to store the measurement results of RSSI values in the lighting appliances 400 is reduced to the amount required for M results.

Embodiment 3

A wireless network system according to embodiment 3 is obtained by adding a function of performing re-routing to the wireless network system of embodiment 1 or 2.

As described above, in the case where routes in a previously constructed mesh network are formed in accordance with the random order in which a route construction packet is received, these routes are not necessarily optimum in terms of signal quality, number of hops, security, and so on between the lighting appliances.

Accordingly, in the wireless network system of embodiment 3, a function of performing re-routing on the basis of measured RSSI values is added to the lighting controller.

Figure 21:
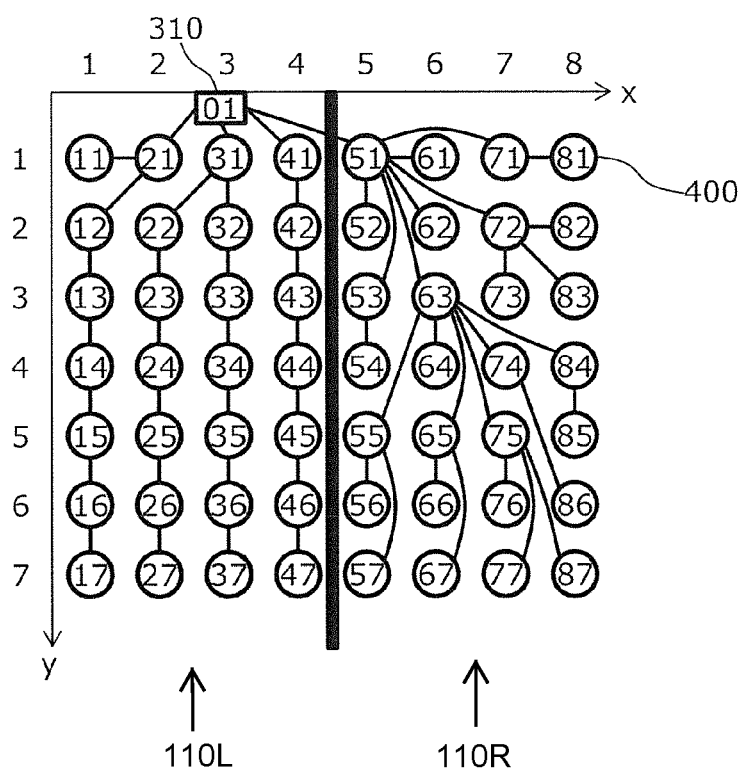
FIG. 21 is a diagram illustrating an example of re-routing results according to embodiment 3.

FIG. 21 is a diagram illustrating an example of routes obtained by performing re-routing. The routes illustrated in FIG. 21 illustrate results obtained by performing re-routing based on a tree network using up to the top twelve RSSI values collected by each lighting appliance.

The gateway 310 is shared by the left room 110L and the right room 110R.

In the left room 110L, route are calculated such that the distance between lighting appliances (in other words, the route length) is minimized and wireless output power of the lighting appliances is minimized.

In the right room 110R, routes are calculated such that the number of hops is minimized.

The routes in both rooms reflect the arrangement of the lighting appliances identified using the measured RSSI values. Furthermore, the routes in the left room have an advantage in that information relating to wireless control is unlikely to leak to the outside and the routes in the right room have an advantage in terms of stability of control, in that the number of packets relating to control is reduced, and in that the network is less likely to become congested.

Modifications

Wireless network systems and reception quality measurement methods used in wireless network systems according to embodiments of the present disclosure have been described above, but the present disclosure is not limited to these embodiments. Various modifications, as thought of by those skilled in the art, made to the embodiments and other embodiments formed by combining constituent elements of different embodiments may also be included in the scope of one or a plurality of modes of the present disclosure so long as the modifications and embodiments do not depart from the spirit of the present disclosure.

For example, rather than a received signal strength indicator (RSSI), a signal-to-noise ratio (S/N), a bit error rate (BER), or the like may be used as reception quality information. In reality, RSSI is the product of an adjustment value of automatic gain control (AGC) and a symbol amplitude, S/N is the symbol error for each ID, and BER is a bit error rate. In order to obtain S/N or BER, an arbitrary pseudo random number signal or a pseudo random number signal in which a bit string is defined in advance may be used instead of RSSI measurement data in the RSSI measurement packet in FIG. 11. Although RSSI is generally the simplest to obtain, S/N or BER also serves as an indicator of connection reliability when used, and therefore it is advantageous to use S/N or BER when performing routing.

Furthermore, in the embodiments, an example is described in which the plurality of lighting appliances sequentially broadcast an RSSI measurement signal under control performed by the lighting controller, but control of the order of broadcast transmission is not limited to this example. For example, the broadcast order may be autonomously controlled through mediation between the plurality of lighting appliances.

INDUSTRIAL APPLICABILITY

The present disclosure can be widely used in a variety of control systems such as a lighting system as a wireless network system and a reception quality measurement method used in a wireless network system.

REFERENCE SIGNS LIST

1, 2 lighting system
100, 110 office
110L, 110R room
101 door
103 desk
104 chair
111 wall
200, 300 lighting controller
210 PC
220, 440 transmission/reception unit
230, 450 antenna
250, 250a arrangement information table
251 ID column
252 planned arrangement column
253 identified arrangement column
310 gateway
320 server
330 mobile terminal
400 lighting appliance
420 LED driving power source
460 microcomputer
500 Internet

The invention claimed is:
1. A wireless network system comprising:
a plurality of wireless devices that each have a unique identifier and transmit/receive a radio signal; and a controller configured to perform an operation sequentially with respect to each of the plurality of wireless devices by:
instructing one wireless device among the plurality of wireless devices to broadcast a measurement signal that includes the unique identifier of that wireless device; and
instructing the other wireless devices to receive the measurement signal and to measure reception quality, which depends on the distance between the wireless devices based on the measurement signal received, and to transmit reception quality information including the measured reception quality to the controller, and
obtaining an arrangement of the plurality of wireless devices using distances between the wireless devices based on the reception quality information.

2. The wireless network system according to claim 1, wherein the measured reception quality comprises a received signal strength indicator (RSSI), a signal-to-noise ratio (S/N), and a bit error rate (BER).

3. The wireless network system according to claim 2, wherein the controller acquires RSSI values for all pairs of the plurality of wireless devices in a one-to-one connection.

4. The wireless network system according to claim 1, wherein each of the plurality of wireless devices transmits, to the controller, the reception quality information representing only top ranking reception qualities, which are fewer in number than the total number of wireless devices, among the measured reception qualities.

5. The wireless network system according to claim 4, wherein the controller stores, in advance, arrangement information representing a planned arrangement of the plurality of wireless devices, and
compares the arrangement of the plurality of wireless devices obtained on the basis of the reception qualities and the planned arrangement represented by the arrangement information.

6. The wireless network system according to claim 4, wherein the controller determines routes from the controller to the plurality of wireless devices in accordance with the arrangement of the plurality of wireless devices obtained on the basis of the reception qualities.

7. The wireless network system according to claim 4, wherein the controller obtains the arrangement of the plurality of wireless devices using only the top ranking reception qualities.

8. The wireless network system according to claim 1, wherein the controller stores, in advance, arrangement information representing a planned arrangement of the plurality of wireless devices, and
compares the arrangement of the plurality of wireless devices obtained on the basis of the reception qualities and the planned arrangement represented by the arrangement information.

9. The wireless network system according to claim 8, wherein the controller determines routes from the controller to the plurality of wireless devices in accordance with the arrangement of the plurality of wireless devices obtained on the basis of the reception qualities.

10. The wireless network system according to claim 1, wherein the controller determines routes from the controller to the plurality of wireless devices in accordance with the arrangement of the plurality of wireless devices obtained on the basis of the reception qualities.

* * * * *